May 7, 1940.  G. A. LYON  2,199,889
WHEEL HUB CAP STRUCTURE
Filed Oct. 21, 1938
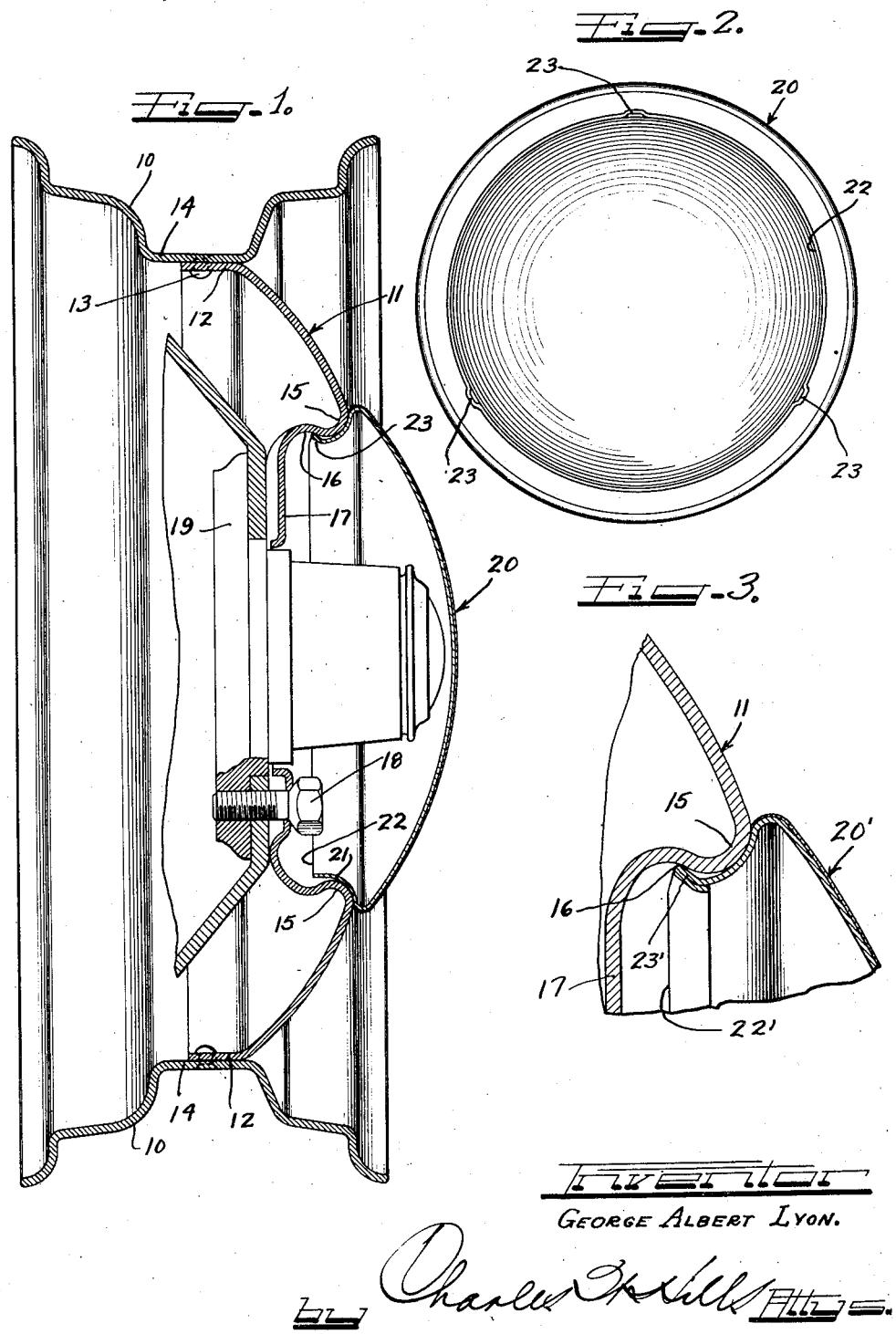
Inventor
GEORGE ALBERT LYON.

Patented May 7, 1940

2,199,889

UNITED STATES PATENT OFFICE 2,199,889

WHEEL HUB CAP STRUCTURE

George Albert Lyon, Allenhurst, N. J.

Application October 21, 1938, Serial No. 236,162

9 Claims. (Cl. 301—108)

This invention relates to a wheel hub cap structure, and more particularly to novel means on a wheel hub cap for snapping it into retained engagement with the body of a wheel.

An object of this invention is to provide a greatly simplified wheel hub cap which may be economically manufactured and which does not require the use of any separate springs for retaining it on the body of a wheel.

A still further object of this invention is to provide a hub cap structure wherein the inner edge of the hub cap is so formed that depressed portions thereof serve to retain the cap in position on the wheel without the provision of any separate fingers or slotted out portions in the hub cap.

In accordance with the general features of this invention, there is provided a wheel hub cap structure including a concealed skirt having a continuous inner flexible circular edge with spaced integral portions thereof depressed laterally from the edge and arranged in a circle of a different diameter from that of the edge such as to require radial displacement of the spaced portions when the hub cap is snapped into engagement with a wheel and so that these portions may thereafter serve to retain the hub cap on the wheel.

Another feature of the invention relates to the strengthening of the retaining portions of the hub cap by forming them of a double thickness of material.

Other objects and features of this invention will more fully appear from the following detailed description taken in connection with the accompanying drawing which illustrates several embodiments of the invention and in which:

Figure 1 is a cross sectional view through a wheel structure including a hub cap embodying the features of this invention;

Figure 2 is a rear view of the hub cap shown in Figure 1; and

Figure 3 is a fragmentary sectional view of a wheel structure showing a modified form of hub cap embodying the features of this invention.

As shown on the drawing:

The reference character 10 designates generally a conventional drop-center type of tire rim which is suitably secured to a wheel body or shell 11 which is sometimes referred to as the hub part of the wheel. Any suitable means, such, for example, as welding or rivets 13, may be used for securing the outer marginal flange 12 of the hub part 11 to the base 14 of the tire rim.

The hub part 11 includes an annular bulged central portion 15 spaced radially outward from a mounting portion 17 for securing the wheel to a suitable wheel support 19. The wheel may be secured to the support by any conventional means such as are now in use or, for example, such as by means of a plurality of cap screws such as the cap screw 18.

The bulged annular portion 15 is spaced from the mounting portion 17 of the hub part 11 by an inclined shoulder 16 at a reentrant angle to the bulged portion 15. That is to say, the inclined shoulder 16 extends radially outwardly from the innermost extremity of the bulged portion 15. Thus, there is provided an upwardly inclined surface or hump over which a portion of the hub cap 20, to be hereinafter described in detail, must pass before the hub cap is properly seated within the centrally bulged portion 15 of the hub part.

The metallic hub cap 20 embodies the novel features of my invention particularly with regard to the means for resiliently retaining the hub cap 20 on the hub part 11 of the wheel. The hub cap 20, as is evident from Figure 2, is of a circular configuration and includes the usual concealed integral skirt 21 which has an inner continuous annular edge 22 of a diameter such that this edge may freely pass through the opening defined by the bulged portion 14 of the wheel hub part. However, this edge 22 is provided with a plurality, such, for example, as three, of circularly spaced depressions 23 which are disposed in a circle of a larger diameter so that these portions must be flexed inwardly in order to pass over the hump defined by the bulged portion 15 of the wheel hub part.

Thus, when the hub is snapped into retained engagement on the wheel body or shell part 11, the depressed sections or portions 23 are flexed inwardly, and the intermediate main portions of the edge 22 of the hub cap are bowed or flexed slightly outwardly whereby the depressed sections 23 may clear the hump and then slide along the inclined shoulder 16 into retaining engagement therewith.

These depressions 23 may be formed in any suitable manner by pressing radially outwardly small portions or sections 23 of the continuous edge 22. Thus, I have provided a structure wherein I am enabled to utilize the resiliency of the continuous edge 22 to effect a retention of the hub cap on the wheel without necessitating the use of any special retaining springs or other fastening means. Moreover, the hub cap may be readily pried loose from the wheel hub part 11 whenever it is desired to have access to the wheel bolts 18 normally concealed by the hub cap 20.

In Figure 3, I have illustrated a modified form of the invention in which the wheel is substantially the same as that shown in Figure 1, and the same numerals have been employed to designate corresponding or identical parts.

The hub cap 20' is provided with a continuous edge 22', which in this instance comprises a turned edge so that the depressed spaced sections or portions 23' have a double thickness of material. This arrangement rigidifies the edge and still does not interfere with the resiliency of the edge at least to such an extent to affect the snap-on retension characteristics of the hub cap.

From the foregoing, it is apparent that I have provided a novel hub cap including a face portion reinforced at its outer periphery by an inturned flexible resilient flange terminating in an axially inward continuous flexible bent edge adapted to be bulged or stressed at a plurality of points for circumferentially spaced engagement and contact behind shoulder portions of the protuberance means 15. The bent edge 22 may, as shown in Figure 3, be reinforced by being turned, thus forming in effect a beaded edge for retaining contact with the protuberance means 15. In both forms of the invention, however, the edge is so bent as to have a smooth sliding contact with the protuberance means as it is pressed axially thereover and behind the same. It will also be perceived that the whole flange 21 acts in its entirety or in unison to exert a cover or cap retaining pressure against the protuberance means, and that the resilient flexing of the flange or skirt 21 occurs against the backing of the reinforced peripheral outer margin of the cap or cover 20. It should also be noted that the reinforced outer peripheral edge of the cap serves as a place of application of a pry-off force to remove the cap from the wheel when it is desired to have access to the wheel fastening bolts 18.

It should also be noted that the subject matter of this application is in part a continuation of my copending earlier filed application Serial No. 233,354, filed October 5, 1938, and that the broader aspects of my invention are common to both applications.

While I have shown a particular embodiment of my invention, it will, of course, be understood that I do not wish to be limited thereto since many modifications may be made, and I therefore contemplate by the appended claims to cover all such modifications as fall within the true spirit and scope of my invention.

I claim as my invention:

1. A closure cap for motor vehicle wheels made of thin metallic material and formed with an outer face portion and a circular pry-off peripheral part made relatively rigid by an inturned flange, said flange having a substantially radially inwardly extending part and a rearwardly extending part terminating in a turned continuous reinforced resilient edge adapted for snap-on pressure-applying holding engagement with cooperating rigid protuberance means located adjacent the outer face of the wheel, said flange also being of a curved cross sectional shape, behind said face portion, whereby said flange may be telescopingly nested inside a cooperating part of the wheel.

2. In combination, a vehicle wheel member and a hub cap member cooperating therewith, said wheel member having shoulder means cooperable with the hub cap member and said hub cap member comprising a central portion and a peripheral portion, said peripheral portion comprising a generally radially extending flange portion, the radially inner portion thereof merging into a substantially axially inwardly extending continuous flexible flange, the axially inner edge of said flange being bent, said edge engaging said shoulder means and having a plurality of circumferentially spaced projections for cooperation with said shoulder means in the flexing of said edge into retaining or stressed engagement with said shoulder means, said edge also when in cooperation with said shoulder means being nested inside thereof and in telescoping relation therewith.

3. A closure cap for motor vehicle wheels made of thin metallic material and formed with an outer face portion and a circular pry-off peripheral part made relatively rigid by an inturned flange, said flange having a substantially radially inwardly extending part and a rearwardly extending part terminating in a turned continuous reinforced resilient edge adapted for snap-on pressure-applying holding engagement with rigid protuberance means located adjacent the outer face of the wheel.

4. A wheel cover comprising a central portion and a peripheral portion, said peripheral portion comprising a generally radially extending flange portion, the radially inner portion thereof merging into a substantially axially inwardly extending continuous flexible flange, the axially inner edge of said continuous flange being bent to provide a wheel engaging portion.

5. In combination, a vehicle wheel comprising rigid protuberance means providing a shoulder at the axially inner side thereof, and a cover comprising a central portion and a peripheral portion, said peripheral portion comprising a generally radially extending flange portion, the radially inner portion thereof merging into a substantially axially inwardly extending continuous flexible flange, the axially inner edge of said flange being bent, said edge engaging the shoulder of said protuberance means.

6. In combination, a vehicle wheel comprising generally radially inwardly extending rigid protuberance means providing a shoulder at its axially inner side, and a cover member comprising a crown portion and a wheel engaging portion, said latter portion comprising a generally radially extending flange portion, the radially inner portion thereof merging into a substantially axially inwardly extending continuous flexible flange, the axially inner edge of said flange being bent, said bent edge engaging the shoulder portion of said protuberance means.

7. In combination, a vehicle wheel comprising generally radially inwardly extending rigid protuberance means providing a shoulder at its axially inner side, and a cover member comprising a crown portion and a wheel engaging portion, said latter portion comprising a flange extending generally radially inwardly from the edge of the crown portion, and merging into a substantially axially inwardly extending continuous flexible flange, the axially inner edge thereof being bent, said bent edge engaging the shoulder portion of said protuberance means.

8. A wheel cover member comprising a crown portion and a portion adapted to cooperate with a wheel body, said latter portion comprising a flange extending generally radially inwardly from the edge of the crown portion, and merging into a substantially axially inwardly extending continuous flexible flange, the axially inner edge thereof being bent, said bent edge adapted to engage behind shoulder portions on a wheel body.

9. In combination, a vehicle wheel including generally radially extending rigid protuberance means, a wheel cap comprising a crown portion and a stiffened inturned outer peripheral portion merging into a rearwardly extending resilient wheel engaging continuous flange, the axially inner edge of said flange being bent so as to have a smooth sliding cooperation with said rigid protuberance means, said resilient flange when forced into holding contact with said protuberance means causing flexing of the resilient flange in one direction at a plurality of points of contact with said protuberance means and a resilient bulge of said flange in an opposite direction at points between said contact points, whereby the whole flange acts in entirety to exert a holding pressure to retain the cap on the wheel.

GEORGE ALBERT LYON.